Dec. 23, 1941.　　　R. A. NORBOM　　　2,266,789
MEANS FOR HANDLING DEMOUNTABLE BODIES
Filed Jan. 5, 1940　　　2 Sheets-Sheet 1

INVENTOR.
BY Ragnar A. Norbom
Balin, Jean & McBean
ATTORNEYS.

Dec. 23, 1941.  R. A. NORBOM  2,266,789
MEANS FOR HANDLING DEMOUNTABLE BODIES
Filed Jan. 5, 1940  2 Sheets-Sheet 2

INVENTOR.
Ragnar A. Norbom,
BY Bates, Teare & McBean
ATTORNEYS.

Patented Dec. 23, 1941

2,266,789

UNITED STATES PATENT OFFICE 2,266,789

MEANS FOR HANDLING DEMOUNTABLE BODIES

Ragnar A. Norbom, Nutley, N. J., assignor to Motor Terminals, Inc., Cleveland, Ohio, a corporation of Ohio Application January 5, 1940, Serial No. 312,571

19 Claims. (Cl. 214—85)

This invention relates to a system of transferring freight by means of demountable bodies which may be moved with their loads from one vehicle to another, or between a vehicle and a platform.

More particularly, the invention is concerned with a vehicle having guideways for positioning the demountable container and having bridges pivotally and extensibly connected with such vehicle, thus furnishing means for connecting such vehicle to another vehicle or to a platform although the distance between them may vary.

The invention is in the nature of an improvement on the pending application No. 309,024, of Benjamin F. Fitch and myself, filed December 13, 1939, assigned to my assignee, Motor Terminals, Inc.

The present invention is concerned particularly with the support for the pivoted extensible bridge in a manner which will prevent excessive tipping of the truck during transfer. It is concerned also with an automatic lock for the demountable body on the vehicle, which lock comes into action automatically when the bridge is retracted. These and other features of the invention will become more apparent from the following detailed description thereof with reference to the accompanying drawings.

Figure 1:
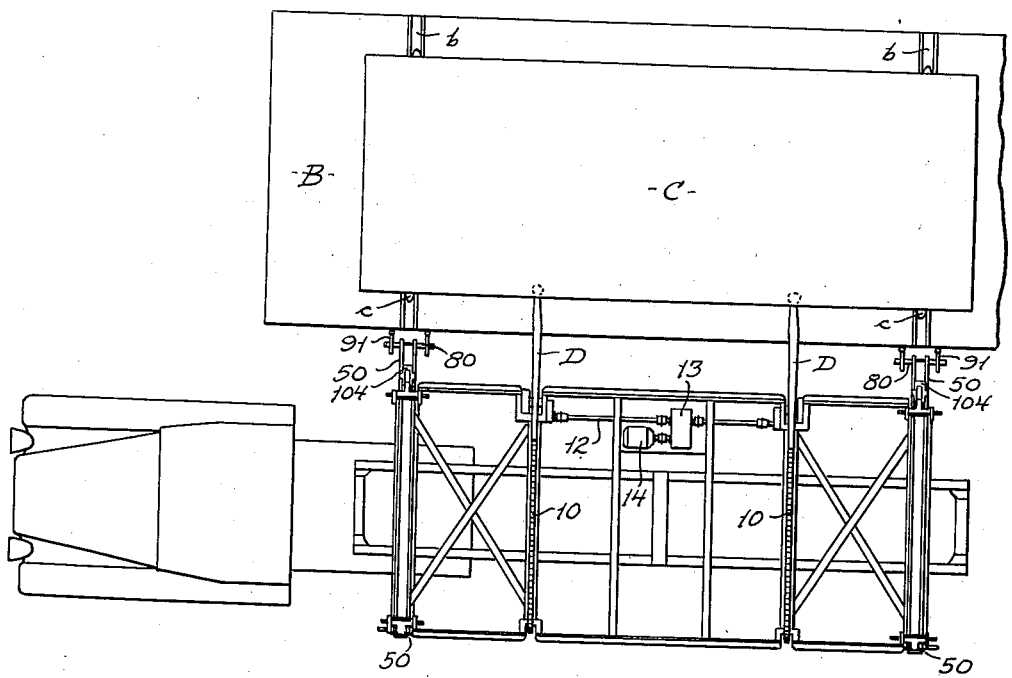
Figure 2:
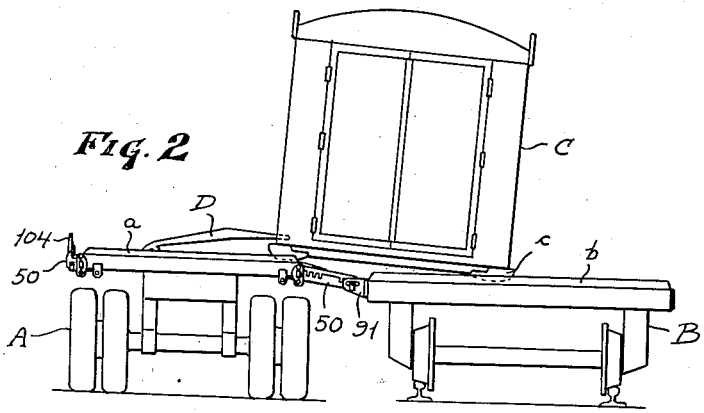
Figure 8:
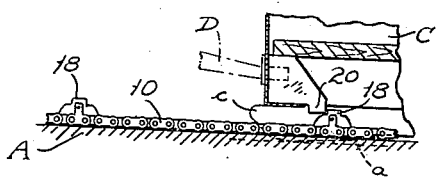
Figure 3:
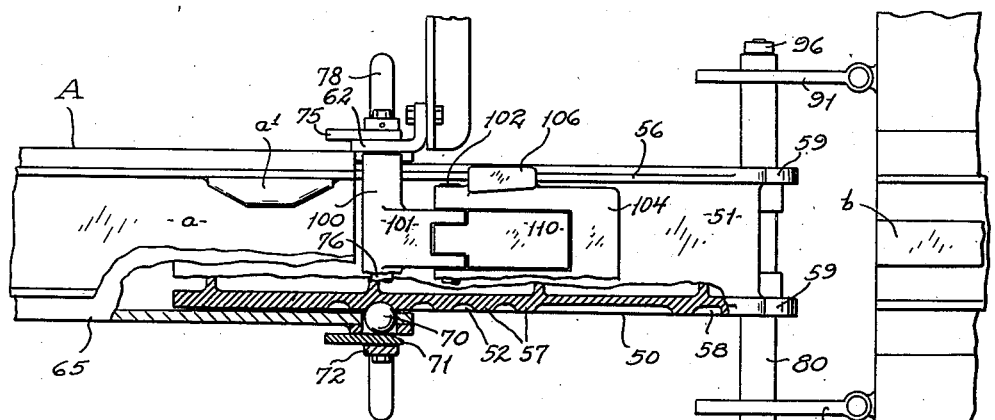
Figure 7:
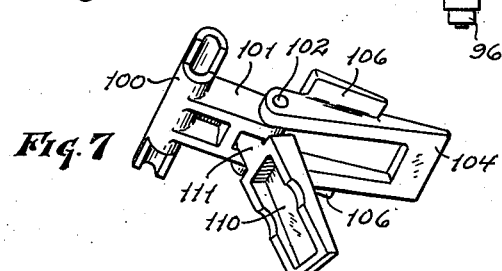
Figure 4:
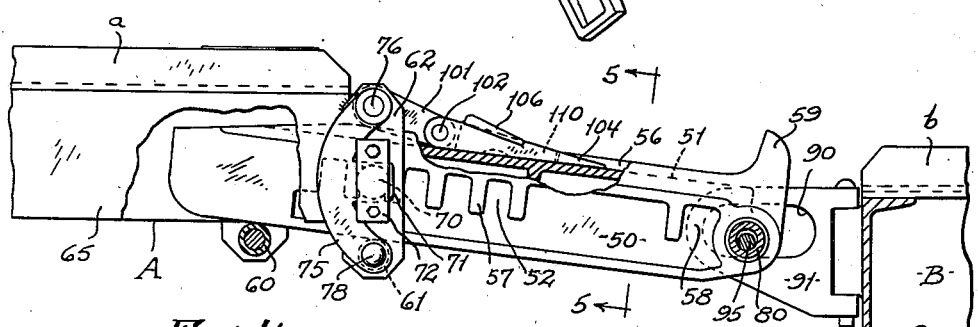
Figures 5, 6:
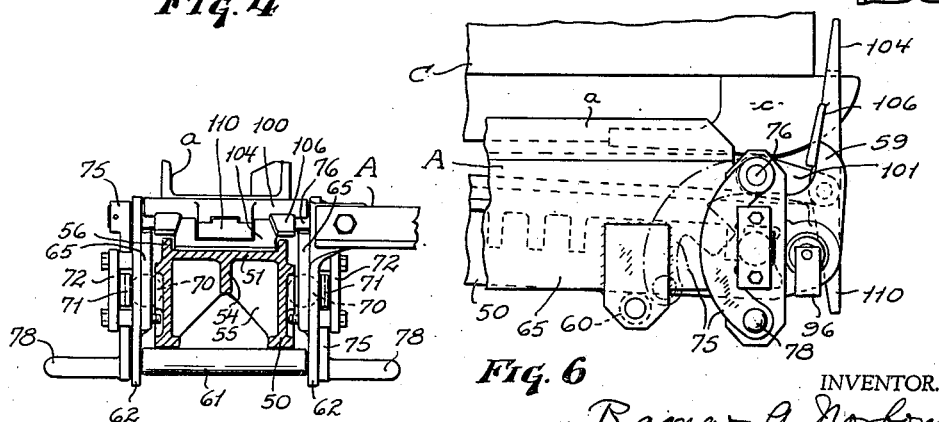

In the drawings, Fig. 1 is a plan of a highway truck, a railway car and a container mounted on the car and coupled with propelling mechanism on the truck ready for transference of the demountable body thereto; Fig. 2 is an end elevation of the highway truck, railway car and demountable body, showing the body as it is passing from one of the vehicles to the other; Fig. 3 is a sectional plan of one of the bridges and the adjacent portion of the highway truck carrying the bridge, and the adjacent part of the railway car to which it is attached; Fig. 4 is an elevation of the parts shown in Fig. 3; Fig. 5 is a substantially vertical section through one of the bridges, as indicated by the lines 5—5 on Fig. 4; Fig. 6 is a fragmentary elevation illustrating the bridge retracted; Fig. 7 is a perspective of the device for locking the container, which also forms a guiding flap for directing the container along the bridge surface; Fig. 8 is a fragmentary elevation of a portion of the propelling chain on the truck and a portion of the container directly engaged thereby.

In Figs. 1 and 2 of the drawings, A represents a highway truck, which may comprise a tractor and trailer; B a railway car, and C, a demountable container adapted to stand either on the car or the truck. As illustrated, the container is of comparatively large size and adapted for mounting on the car or truck lengthwise thereof, and to be shifted laterally across the side of the truck to the car and vice versa.

As shown, the container C has skid rails $c$ on its base which are adapted to occupy upwardly facing channels $a$ on the truck or $b$ of the car. To propel such container from the truck to the car or vice versa, I may, if desired, employ the mechanism illustrated in Fig. 1. While this mechanism, and various contributing features are not, per se, claimed in this application, it is convenient to describe them at this point.

Mounted transversely of the truck are a pair of endless propelling chains 10 looped around suitable sprocket wheels, not shown. One sprocket wheel for each chain may be coupled to a shaft 12 which is connected through reduction gearing in a housing 13 with the driving motor 14, so that the motor may move the two chains in unison. Each sprocket chain is composed of pairs of overlapping inner links and outer links connected by transverse pins which provide means for anchoring push-and-pull bars D the other ends of which may be attached to the container. Some of the chain links carry projections adapted to engage abutments on the base of the container and thus propel it independently of the push-and-pull bars, as explained in our pending application mentioned.

The demountable body has suitable means at its sides for attaching the ends of push-and-pull bars D, the other ends of which may be attached to propelling chains 10, and thus the body may be pushed or pulled in the manner indicated in Fig. 2. To start the body from the truck or to complete the placing of it on the truck, I provide the periodic projections 18 on the chains above referred to. These extend upwardly from the upper reach of the chain and are adapted to coact with downward projections 20 on the body, as illustrated in Fig. 8.

Accordingly, the chains may move the body from its normal position on the truck sufficiently for attachment of the push-and-pull bars, which may then complete the transfer of the body onto a flat car, as illustrated in Fig. 1. In withdrawing the body from the flat car when the ends of the push-and-pull bars reach the far edge of the truck, they are detached and then the chain by its direct engagement of the body completes the transfer.

To avoid the necessity of levelling the truck in exact correspondence with the height of the car, and of bringing the truck to an exact distance from the side of the car to enable the transfer of the body from one vehicle to the other, I provide bridges 50 which are adapted to be pivotally connected to the truck at selected points on the bridges, the far ends of these bridges being thereafter attached to the car side. Accordingly, when the bridges are positioned and attached to the car, they provide substantially continuous guideways and supports between the vehicles, notwithstanding variable height and variable separation of the vehicles, and notwithstanding the change in relative elevation as the load passes from one vehicle to the other.

Such bridges, pivotally connected at selected points to the truck are claimed in the copending application heretofore mentioned. In the present case, however, I have changed the supports for the bridges so as to prevent undue tipping of the truck platform, and I have also provided abutments on the bridges which coact with the locking mechanism to automatically lock the container on the truck. These features, which are claimed herein, will now be described.

The support for the bridge 50, as shown in Fig. 4, comprises a pair of rollers 60 and 61 comparatively close together, so that the bridge engages both of them when it is attached to the car side. This makes a semi-rigid connection which prevents the excessive tipping of the body, which might result if the bridge were freely pivoted to the truck side, and adapted to swing substantially an unlimited amount in either direction.

In the embodiment shown, there are four of the variable pivoted bridges 50, two on each side of the truck, each bridge being adjacent an end of one of the transverse guideways $a$. These guideways are preferably upwardly facing channels provided with spaced inward projections $a^1$ (Fig. 3) to coact with the skid rails $c$ on the base of the container. These channels $a$ are mounted on transverse beams which are in the form of downwardly facing channels 65 forming a housing for the bridges. These beams are conveniently made of two angle bars having horizontal upper flanges abutting and welded together, and vertical downward flanges spaced apart, as shown in Fig. 5, and thus provide openended housings, beneath the guideways in which the bridges are telescopically mounted.

Each bridge comprises a steel casting or forging having a guiding surface 51 along its top face and a succession of keepers in the form of recesses 52 along its opposite sides to coact with plungers hereinafter described. The bridge is preferably a hollow member, as indicated in Fig. 5, the top portion 51 being strengthened by a longitudinal web 54, and there being various cross-shapes 55 to brace the sides and top. The sides preferably extend slightly above the top as at 56 to make the guideway channel-shaped as desired.

The keepers on the sides of the bridges are preferably recesses 52, formed between integral bosses 57 on the bridges, and the plungers which coact with the keepers are conveniently balls 70 adapted to occupy any of such recesses and be held therein by means of wedge plates 71 occupying the space between the outer face of the balls and stationary frame straps 72, all as hereinafter described.

To manipulate the wedges 71 in a convenient manner, I form these wedges as extensions of levers 75, which are mounted on a rock shaft 76 journalled in the upper ends of reinforcers 62 which are secured to and project above the vertical flanges of angle bars 65. Each of the levers 75 is preferably provided with an outwardly extending handle 78. Accordingly, the manipulation of either handle may operate the rock shaft and swing the two wedges into or out of engagement as desired.

It will be seen from Fig. 4 that there is an additional downwardly facing recess designated 58, near the free end of the bridge. This recess is for the purpose of enabling the bridge to be locked in its idle or telescoped position. When the bridge is in this position, as shown in Fig. 6, this recess 58 is in registration with the ball 70, and accordingly when the levers 75 are brought into the position shown in full lines in Fig. 6, the balls are cammed into the recesses 58, and the bridge locked in idle position, suitable for traveling.

When the truck arrives at the destination for transfer, and it is desired to draw out the bridges to attach them to the side of the car or platform, it is only necessary for the operator to manually shove inwardly the locking levers 75 by pressure on their handle 78, swinging them into the position shown in broken lines in Fig. 6. Then each bridge may be drawn out manually to the desired position, after which its pivotal connection to the truck is effected by the return of the levers 75 and the consequent camming of the balls into registration with the selected recesses 52.

Any suitable means may be employed for attaching the free end of the bridge to the car side. As shown in the drawings, the bridge is provided adjacent its free end with a tubular bar 80, which is adapted to be received in slots 90 formed in wings 91 pivoted to the car side (normally parallel therewith as indicated in broken lines in Fig. 3) adapted to be swung out onto the position shown in full lines over the ends of the extensions 80. The tubular member may contain a rod 95, having short arms 96 at its ends, and when these arms are turned into registration with the slots 90, the wings may be passed over the tubular rod and then when the arms extend downwardly to the wings, the parts are retained in engagement. This construction is not claimed herein, but in Patent No. 2,126,763, of our assignee, Motor Terminals, Inc.

When the bridges are attached, as above described, and supported by the car wings 91, and the truck rollers 60 and 61, they connect the truck with the car, thus providing substantially continuous guideways between the channels $a$ of the truck and the channels $b$ of the car. However, as the bridge is some distance lower than the channel $a$ of the truck, I provide an intermediate device to form an easy runway from the bridge to the truck guideway, and furthermore, I arrange this device to act as a lock for the container on the truck, as I will now describe.

Mounted on the rock shaft 76 carrying the levers 75 is a sleeve 100 (Figs. 3 and 7) from which extends an arm 101. Pivoted to such arm at 102 is a flap 104 adapted to rest on the top face of the bridge between the upper side flanges 56 thereof, as shown in Figs. 3 and 4. The flap has projecting wings 106 which extend over the top flanges of the bridge.

The position of the flap 104 in use is as shown in Fig. 4. The flap is an open loop as shown in Figs. 3 and 7, and by being turned into an upright position comes over the skid rail $c$ on the container C as shown in Fig. 6. The flap is retained in this position when the bridge is retracted by means of the engagement of abutments 59 on the bridge with the flap wings 106, as shown in Fig. 6, thus locking the container on the truck when the retracted bridge is locked by the balls locked in the bridge recesses 58.

To turn the flap 104 upwardly into locking position automatically when the bridge is retracted, I make the engaging surfaces of the abutments 59 lead gradually from the top of the bridge, so that as the bridge is retracted the engaged flap is automatically cammed upwardly into locking position. I prefer to make the abutments 59 by upward, gradually curved extensions of the end portions of the top flanges 56 of the bridge itself.

It will be understood from the above description that when the bridge is shoved inwardly into such position as that indicated in Fig. 6, the abutments 59, engaging the wings 106, tip the flap upwardly so that as the bridge reaches its innermost position, the flap is swung over the projecting end of the container skid rail. In this position of the bridge, the endmost recesses 58 are in registration with the freed balls 70, so that when these balls are returned to active position by the swinging down of the levers 75 the bridge is locked in its innermost position, and this automatically locks the container.

When the flap is turned down into approximately horizontal position, to act as a guide, it is desirable that the opening therein made to embrace the skid rail shall be substantially closed to provide a better guiding surface. To accomplish this, I provide a block 110 having a tongue 111 passing into a fork formed on the free end of the arm 101, this block being pivoted to that arm by the same pin 102 which pivots the flap. When the flap extends vertically to lock the container on the truck, as shown in Fig. 6, the block 110 depends idly across the end of the bridge. When the bridge is freed for movement by operation of the lever 75, and is drawn outwardly, this movement swings the block 110 upwardly and at the same time frees the flap 104 so that it may swing downwardly, with the result that when the bridge comes into its outermost position the flap and block rest on top of the bridge as shown in Fig. 3. Thus when the projecting tubular rod 80 of the bridge is attached to the car wings and the inner portion of the bridge rests on one or the other of the truck rollers 60 or 61, I have provided a substantially continuous surface along the top face of the bridge from the car channel b to the channel a on the truck.

When the container is drawn from the railway car toward the truck each skid rail slides along the top of the bridge and up the filler device and thus makes a downward stress on the inner portion of the bridge and the adjacent part of the truck, which tends to tip downwardly that edge of the truck, but the amount of such tipping is limited by those parts of the truck which limit the downward swing of the inner end of the bridge. As the inner end of the bridge overhangs the roller 60, as illustrated in Fig. 4, when it couples the truck and car, the downward movement of that edge of the truck must stop when the shaft 76 comes into engagement with the top of the bridge, the bridge thus becoming bound at the top by the rod 76, and at the bottom by the roller 60, and this makes a rigid unit with the truck frame. Any further descent of the truck platform allowed by its springs would be a swinging movement about the axis of the rod 80 as a center; this would make a practically vertical descent of the load.

To prevent any conflicting stresses on the sleeve 100, which is part of the carrier for the guiding flap, the sleeve is cut away on the under surface near the ends, as shown in Fig. 7, so that the edges 56 of the bridge clear the sleeve and engage directly on the rod 76.

In the transference of a container from a railway car to a truck, we will assume that the bridges are drawn out to some such position as indicated in Fig. 4, and are attached to the car, and that the push-and-pull bars are connected to the container and to the propelling chains on the truck. At this time, the bridges will naturally rest at their inner ends on the rollers 61 with their bottoms some distance above the rollers 60. Now when the movement of the container from the railway car is started, the downward stress on the bridge causes it to swing about the axis of the rod 80 as a pivot, thus carrying downwardly the innermost end of the bridge until the same engages the roller 60, then any further downward stress on the bridge will draw downward the adjacent edge of the highway truck until parts carried thereby come into binding engagement with the top of the bridge. As shown, this will be when the rock shaft 76 engages the top of the bridge, then the bridge and highway vehicle are held as a unit, and further tipping of the vehicle is prevented. This makes a firm support to receive the container as it is propelled up the filler device and finally onto the guiding channels of the truck. Corresponding results take place when the container is transferred from the truck to the railway car.

I claim:

1. The combination of a highway truck, a guideway thereon for a container, a container having a skid rail adapted to engage the guideway and project beyond a vertical wall of the container, a locking device on the truck adapted to loop over the projecting end of the skid rail, a movable bridge on the truck adapted to be attached to a support to form a guideway for the container between the truck and said support, and means whereby the positioning of the bridge in an idle position on the truck may maintain the locking device in its active position, locking the container on the truck.

2. The combination of a truck, a bridge telescopically carried thereby, a latch on the truck adapted to engage a container on the truck, means whereby the bridge in an idle position may maintain the latch active, and means for locking the bridge in such idle position and in any one of a plurality of active positions.

3. The combination of a highway truck having a guide for a demountable container, a bridge pivotally and telescopically carried by the truck, a latching device on the truck adapted to engage a skid rail on a container to hold the container on the truck, means actuated by the bridge as it comes into telescoped position on the truck to move said device into latching position, and means for locking the bridge in its telescoped position.

4. The combination of a truck having a guideway for a demountable container, a bridge mounted on the truck in position to be in general registration with the guideway, but in a lower region, a device movably carried by the truck and acting in one position as an intermediate guide between the bridge and guideway, and in another position as a latch for a container on the truck, and means on the bridge for holding the latch in its active position.

5. The combination of a vehicle having a guideway for a demountable container, a housing beneath the guideway, a bridge telescopically mounted in the housing adapted to project variable distances beyond it, means for pivotally securing the inner portion of the bridge to the truck, a flap adapted to engage the top of the bridge and form an intermediate guideway from the bridge to the guideway on the vehicle, said flap being pivotally mounted and being adapted to be turned upwardly on its pivot into position to engage the container, the container and flap being provided with inter-engaging shoulders, and means for retaining the flap in its upright position to hold the container down on the vehicle.

6. The combination of a support for a guideway for a demountable container, the demountable container having a skid rail adapted to rest on a guideway, a stirrup pivotally mounted on the support adapted to be swung upwardly on its pivot and pass over the projecting end of the skid rail, a bridge adapted to extend from the support and be attached thereto in a lower region than the guideway on this support, said stirrup being adapted to turn down on its pivot so as to rest on top of the bridge and form an intermediate guide from the bridge to the guideway on the support.

7. The combination of a vehicle having a guideway, a demountable container having a skid rail adapted to coact with said guideway, a bridge telescopically carried by the vehicle, a flap adapted to engage the bridge and form an intermediate guideway from the bridge to the guideway on the truck, said flap being in the form of a stirrup pivotally mounted and being adapted to be turned upwardly on its pivot into position to receive in its opening the projecting end of the skid rail of the container on the vehicle, and means whereby the bridge when telescoped holds the stirrup in such latching position.

8. The combination of a vehicle having a guideway for the skid rail of a demountable container, a bridge mounted on the vehicle in position to be in general registration with the guideway, but at a lower level, and a stirrup pivotally carried by the vehicle and acting in one position as an intermediate guide between the bridge and guideway, and in another position looping over the projecting end of the skid rail on the container, and means on the bridge adapted to engage the stirrup when the bridge is moved into its inner position on the vehicle to swing the stirrup upwardly on its pivot to cause it to engage the skid rail of the container, and means for locking the bridge in its inner position, thereby locking the stirrup whereby the stirrup locks the container.

9. The combination of a vehicle having a guideway for a demountable container, a bridge movably carried by the vehicle, a pivotally mounted stirrup adapted to lie on the bridge and form a guide from it to the guideway on the vehicle, said stirrup being adapted to be raised to loop over the projecting end of a skid rail on a container on the guideway, and a filler block adapted to occupy the opening in the stirrup when it is acting as a guideway on the bridge.

10. The combination of a vehicle having a guideway, a bridge telescopically carried thereby, a pivotally mounted stirrup adapted to lie on the bridge and form a guide from it to the guideway on the vehicle, said stirrup being adapted to be raised by the telescoping movement of the bridge to loop over the projecting end of a skid rail on a container on the guideway, and a filler block adapted to occupy the opening in the stirrup when it is acting as a guideway on the bridge and being free therefrom when the stirrup is acting as a latch for the container.

11. The combination of a vehicle having a guideway for positioning a demountable container, a bridge movably carried by the vehicle adapted to project beyond the edge thereof at a lower level than the guideway, a stirrup pivotally carried by the vehicle and adapted to extend into an approximately horizontal position to act as a guide from the bridge to the guideway on the vehicle, or into an approximately vertical position to overhang a skid rail on a container on the guideway, a pivotally mounted filler block adapted to occupy the opening of the stirrup with its top on substantially the same level therewith when the stirrup is on the bridge and adapted to be in idle position when the stirrup is active as a lock.

12. The combination of a vehicle having a yieldingly supported platform, a bridge pivotally carried by the platform in any selected one of several intermediate points on the bridge, means for attaching the free outer end of the bridge to a separate support, and means on the vehicle adapted to be engaged by the portion of the bridge on the inner side of the pivotal engagement thereof for limiting the downward tipping of the edge of the vehicle adjacent the bridge when the other end of the bridge is so attached.

13. The combination of a highway truck, a bridge extensibly carried thereby, means for establishing a pivotal connection between the highway truck and an intermediate region of the bridge, the free end of the bridge on the outer side of the pivotal connection being adapted to be attached to a vehicle or platform, and means on the vehicle adapted to be engaged by the inner portion of the bridge on the inner side of the pivotal connection for limiting the downward movement of the innermost end of the bridge when its far end is so attached and a downward stress is applied to an intermediate region.

14. The combination of a highway truck, a bridge extensibly and pivotally carried by the truck, means for attaching the far end of the bridge to a vehicle or platform, two adjacent supports on the truck either of which is adapted to engage the under side of the bridge and support it when the bridge is in its extended position and attached at its far end to a vehicle or platform, and means on the truck adapted to coact with the top of the bridge to limit the relative downward movement of that edge of the truck.

15. The combination of a highway truck having a transverse guide for supporting a demountable body, and having a transverse open ended housing beneath the guide, a bridge telescopically mounted in the housing, the housing carrying two adjacent members either of which may support the bridge when extended into active position, while the other member is inactive, means on the truck to engage the top of the bridge to limit tipping of that edge of the truck, means for preventing the telescoping of the bridge into its housing, and means for attaching the free end of the bridge to a support.

16. The combination of a vehicle, a guide thereon for supporting a container movable to and from the vehicle, a bridge telescopically carried by the vehicle, mechanism for locking the bridge in any one of a number of projecting positions, a latching device to engage the container and hold it on the vehicle, and means whereby the bridge when it is in non-active position coacts with the latching device, the mechanism which locks the bridge in an active position acting also to lock it in its inactive position to maintain the latching device active and thereby effect the locking of the container on the vehicle.

17. The combination of a vehicle, means for positioning thereon a container with a skid rail having a projecting end, a stirrup mounted on the vehicle and adapted to extend over such projecting end, a bridge telescopically carried by the vehicle, means on the bridge when it is in idle position to engage the stirrup retainingly, and means for locking the bridge in its idle position, whereby the container is locked to the vehicle.

18. The combination of a highway truck having a pair of hollow beams forming parallel housings, a pair of upwardly facing channels carried on the tops of said housings, a container having skid rails on its base adapted to occupy the channels, the ends of said skid rails projecting, a pair of bridges telescopically mounted in the hollow housings and adapted to be drawn out and connected at their free end to a railway car or platform, a pair of stirrups adapted to overlap the projecting ends of the skid rails, each bridge having a projection adapted to overlap the stirrup when the bridge is in its innermost position, and means for locking the bridge in such innermost position, thereby locking the stirrup and the stirrup locking the container.

19. The combination of a vehicle, adapted to support a demountable container, an open-ended housing on the vehicle, a bridge telescopically mounted in the housing and having its free end adapted for attachment to a platform or railway car, supporting means on opposite sides of the housing, a retaining device movably carried by said supporting means to engage the container for the purpose of locking it to the vehicle, means on the bridge adapted to engage said retaining device to hold it in active position, and locking devices carried by the housing and adapted to coact with the bridge to lock it in idle position at the time the bridge locks said retaining device in its active position.

RAGNAR A. NORBOM.